(12) United States Patent
Van Hove et al.

(10) Patent No.: US 9,162,372 B2
(45) Date of Patent: Oct. 20, 2015

(54) INTEGRAL TWO LAYER PREFORM, PROCESS AND APPARATUS FOR THE PRODUCTION THEREOF, PROCESS FOR PRODUCING A BLOW-MOULDED BAG-IN-CONTAINER, AND BAG-IN-CONTAINER THUS PRODUCED

(75) Inventors: Sarah Van Hove, Boutersem (BE); Daniel Peirsman, Bornem (BE); Rudi Verpoorten, Lommel (BE)

(73) Assignee: Anheuser-Busch InBev S.A., Brussels (BE)

( * ) Notice: Subject to any disclaimer, the term of this patent is extended or adjusted under 35 U.S.C. 154(b) by 604 days.

(21) Appl. No.: 12/450,892

(22) PCT Filed: Apr. 18, 2008

(86) PCT No.: PCT/EP2008/054772
§ 371 (c)(1),
(2), (4) Date: Jul. 8, 2010

(87) PCT Pub. No.: WO2008/129018
PCT Pub. Date: Oct. 30, 2008

(65) Prior Publication Data
US 2010/0330313 A1     Dec. 30, 2010

Related U.S. Application Data

(63) Continuation of application No. 11/785,750, filed on Apr. 19, 2007, now abandoned.

(51) Int. Cl.
*B32B 1/02* (2006.01)
*B32B 1/04* (2006.01)
(Continued)

(52) U.S. Cl.
CPC .............. *B29B 11/14* (2013.01); *B29C 49/221* (2013.01); *B65D 23/02* (2013.01);
(Continued)

(58) Field of Classification Search
CPC .............. B65D 23/02; B65D 33/0055; B65D 83/0055; B29B 11/14; B29B 2911/1408; B29B 2911/14066; B29B 2911/14093; B29B 2911/14053; B29B 2911/1414; B29C 49/06; B29C 2045/1601; B29C 2045/1684; B29K 2023/086; B29K 2067/00; Y10T 428/13; Y10T 428/1352
USPC ................. 428/34.1, 35.7; 220/495.06, 62.11
See application file for complete search history.

(56) References Cited

U.S. PATENT DOCUMENTS 3,450,254 A  6/1969  Miles
3,484,011 A  12/1969  Greenhaigh et at.
(Continued)

FOREIGN PATENT DOCUMENTS

EP  0 759 399       2/1997
EP  1 356 915 A1   10/2003
(Continued)

OTHER PUBLICATIONS

Machine english translation of JP 10-180853.*

*Primary Examiner* — Yan Lan
(74) *Attorney, Agent, or Firm* — Levy & Grandinetti

(57) ABSTRACT

The invention is an integral two-layer preform (1) for the production of integrally blow-moulded bag-in-containers (2). The preform has an inner layer (11) and an outer layer (12), wherein the preform forms a two layer container upon blow-moulding, and wherein the thus obtained inner layer of the container releases from the thus obtained outer layer upon introduction of a gas at a point of interface of the two layers. The melting temperature of the inner layer is greater than or equal to the melting temperature of the outer layer.

1 Claim, 2 Drawing Sheets

(51) Int. Cl.
  B29C 49/22 (2006.01)
  B29B 11/14 (2006.01)
  B65D 23/02 (2006.01)
  B65D 83/00 (2006.01)
  B29C 49/06 (2006.01)
  B29C 45/16 (2006.01)
  B29K 23/00 (2006.01)
  B29K 67/00 (2006.01)
  B29K 77/00 (2006.01)

(52) U.S. Cl.
  CPC .... B65D 83/0055 (2013.01); *B29B 2911/1408* (2013.01); *B29B 2911/1414* (2013.01); *B29B 2911/1444* (2013.01); *B29B 2911/14053* (2013.01); *B29B 2911/14066* (2013.01); *B29B 2911/14093* (2013.01); *B29B 2911/14113* (2013.01); *B29B 2911/14326* (2013.01); *B29B 2911/14333* (2013.01); *B29C 49/06* (2013.01); *B29C 2045/1601* (2013.01); *B29K 2023/06* (2013.01); *B29K 2023/065* (2013.01); *B29K 2023/086* (2013.01); *B29K 2023/12* (2013.01); *B29K 2067/00* (2013.01); *B29K 2067/046* (2013.01); *B29K 2077/00* (2013.01); *Y10T 428/13* (2015.01); *Y10T 428/1352* (2015.01)

(56) References Cited

U.S. PATENT DOCUMENTS

| | | | | |
|---|---|---|---|---|
| 4,330,066 | A |   | 5/1982 | Berliner |
| 5,301,838 | A | * | 4/1994 | Schmidt et al. .................. 222/95 |
| 6,238,201 | B1 |   | 5/2001 | Safian |
| 6,649,121 | B1 | * | 11/2003 | Hamamoto et al. .......... 264/513 |
| 2009/0206524 | A1 | * | 8/2009 | Laidler et al. ................. 264/516 |
| 2010/0239799 | A1 | * | 9/2010 | Van Hove et al. ........... 428/35.7 |

FOREIGN PATENT DOCUMENTS

| | | | |
|---|---|---|---|
| EP |   | 1 547 768 |   | 6/2005 |
| EP |   | 1 593 605 |   | 11/2005 |
| JP |   | 06 345069 |   | 12/1994 |
| JP |   | 9-208688 |   | 8/1997 |
| JP |   | 10-128833 |   | 5/1998 |
| JP |   | 10-180853 | * | 7/1998 |
| JP |   | 11-010719 |   | 1/1999 |
| JP |   | 2000 062745 |   | 2/2000 |
| JP |   | 2005-047172 |   | 2/2005 |
| WO | WO 90/07555 | * | 1/1989 |
| WO | WO 91/08099 |   | 6/1991 |

* cited by examiner

INTEGRAL TWO LAYER PREFORM, PROCESS AND APPARATUS FOR THE PRODUCTION THEREOF, PROCESS FOR PRODUCING A BLOW-MOULDED BAG-IN-CONTAINER, AND BAG-IN-CONTAINER THUS PRODUCED

This application claims priority to and is the U.S. National Phase of International Application Number PCT/EP2008/054772, filed on Apr. 18, 2008, which is a continuation-in-part of U.S. application Ser. No. 11/785,750, filed on Apr. 19, 2007, now abandoned.

FIELD OF THE INVENTION

The present invention relates in general to new developments in dispensing bag-in-containers and, in particular, to Integral two layer preforms particularly advantageous for the production of integrally blow-moulded bag-in-containers. It also relates to a method for producing said preforms and bag-in-containers.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere the mouth and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were and still are produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. Nos. 3,484,011, 3,450,254, 4,330,066, and 4,892,230. These types of bag-in-containers have the advantage of being reusable, but they are very expensive and labour-intensive to produce.

More recent developments focused on the production of "integrally blow-moulded bag-in-containers" thus avoiding the labour-intensive step of assembling the bag into the container, by blow-moulding a polymeric multilayer preform into a container comprising an inner layer and an outer layer, such that the adhesion between the inner and outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121). When the former method is advantageous in terms of productivity, the latter is preferable when wall thickness accuracy is required, typically in containers for dispensing beverage.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production of co-layered containers (cf. EPA1356915).

The formation of the vents fluidly connecting the space or interface between bag and bottle to the atmosphere remains a critical step in integrally blow-moulded bag-in-containers and several solutions were proposed in e.g., U.S. Pat. Nos. 5,301,838, 5,407,629, JPA5213373, JPA8001761, EPA1356915, U.S. Pat. No. 6,649,121, JPA10180853.

One redundant problem with integrally blow-moulded bag-in-containers is the choice of materials for the inner and outer layers which must be selected according to strict criteria of compatibility in terms of processing on the one hand and, on the other hand, of incompatibility in terms of adhesion. These criteria are sometimes difficult to fulfil in combination.

The preform usually consists of an assembly of two separate preforms and produced independently from one another and thereafter assembled such that the inner preform fits into the outer preform as illustrated in JPA10180853. This solution allows for greater freedom in the design of the neck and vents, as well as in the choice of materials for the inner and outer layers: the compatibility in terms of processing between the materials of the inner and outer layers concern the blow-moulding operation only. It is, however, expensive as it requires two separate production lines and an assembly line.

Replacing a preform assembly as discussed above by an integral preform obtained by injection moulding one layer on top of the other offers of course a number of potential advantages in terms of production costs. Other problems, however, arise and need be addressed. In particular, the choice of materials for the inner and outer layers is more complex since they must be compatible in terms of process in both the injection moulding and the blow-moulding operations. U.S. Pat. No. 5,301,838 discloses a complex injection moulded, five layer, integral preform comprising three PET layers interleafed by two thin layers of a material selected from the group of EVOH, PP, PE, PA6. This solution, however, is quite complex and requires that the materials of the thin layers have "little if any primary affinity for (i.e;, tendency to chemically bond or adhere to) the adjacent [PET] layers," which unduly restricts the choice of materials to be used.

EPA1356915 and U.S. Pat. No. 6,649,121 proposes that the materials for the inner and outer layers of the preform should be selected such that the melting temperature of the outer layer is higher than the one of the inner layer, $T_{m,outer} > T_{m,inner}$, lest a strong bond would form between layers when the inner layer is injection moulded over the outer layer, which had been injected into the mould cavity first. Examples of materials for the outer layer given by the authors include PET and EVOH, whilst polyethylene is given as an example for the inner layer.

It follows from the foregoing that there remains room in the art for solutions for the production of integral preforms made of materials compatible in terms of processing, both for the injection moulding and blow-moulding operations, and yielding bag-in-containers with good delamination properties.

SUMMARY OF THE INVENTION

The present invention is defined in the appended independent claims. Preferred embodiments are defined in the dependent claims. In particular the present invention relates to an integral two-layer preform and a bag-in-container produced by blow-moulding the preform, the preform comprising an inner layer and an outer layer, wherein the preform forms a two layer container upon blow-moulding, and wherein the thus obtained inner layer of said container releases from the thus obtained outer layer upon introduction of a gas at a point of interface of the two layers. The melting temperature of the inner layer is greater or equal to the melting temperature of the outer layer.

Preferably, the preform comprises at least one interface vent running parallel to the interface between the inner and outer layer, and opening to the atmosphere at a location adjacent to, and oriented coaxially with the preform's mouth.

It also concerns a process for the production of a preform as defined above comprising the following sequential steps:
injection moulding the inner layer onto a core;
injection moulding the outer layer onto the inner layer;
extracting the thus formed preform from the core; wherein
the melting temperature of the inner layer is greater or equal to the melting temperature of the outer layer.

The foregoing process is advantageously carried out for the production of said preform comprising at least one interface vent, by using a tool of the core-shell type, characterized in that it comprises a core mould provided at the base thereof with at least one pin, preferably wedge shaped, suitable for forming a vent at the interface between the first and second layers of said preform.

The invention further addresses an apparatus for producing a preform as defined above of comprising:
support means provided with at least two similar cores (male);
at least first and second shell moulds (female) each connected to an extruder, such that the first shell mould is dimensioned for producing in combination with a core the inner layer and the second shell mould for producing the outer layer on top of the inner one;
optionally at least one extraction station,
means for moving the support means so that each core can be positioned sequentially opposite the first shell mould, the second shell mould, and optionally the extraction station.

DETAILED DESCRIPTION OF THE INVENTION

Figure 1:
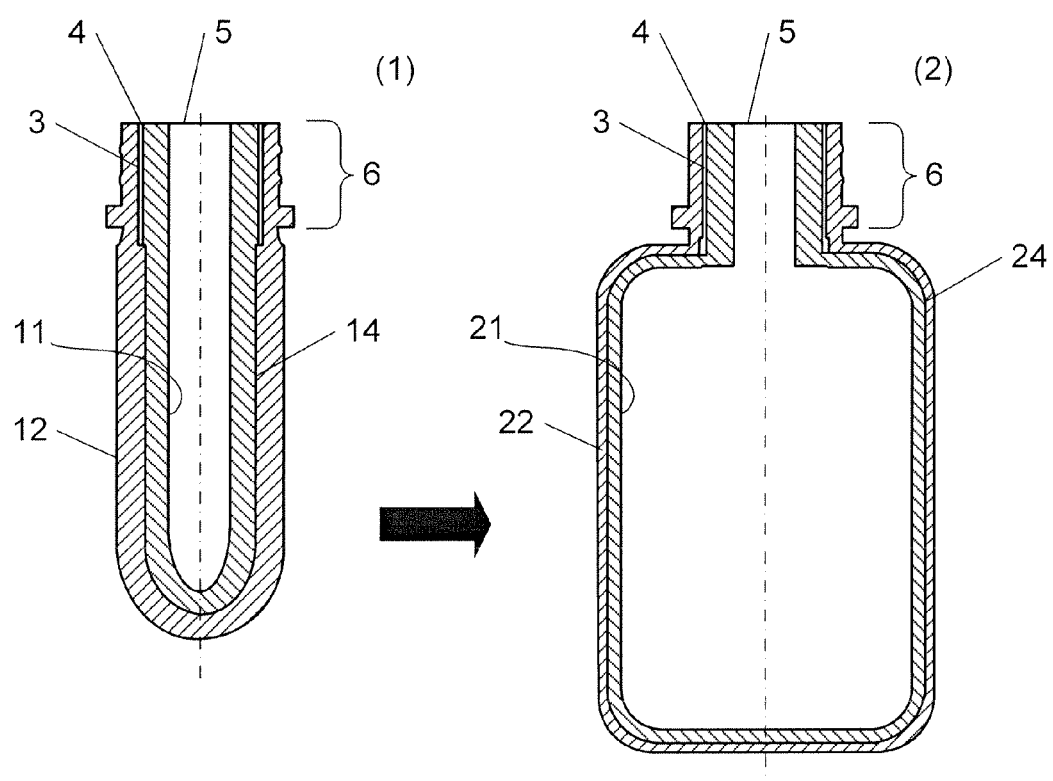
FIG. 1 is a schematic cross-sectional representation of a preform and the bag-in-container obtained after blow-moulding thereof.

Referring now to appended FIGS. 1A and 1B, there is illustrated an integrally blow-moulded bag-in-container (2) and a preform (1)&(1') for its manufacturing. The preform (1) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3) opening to the atmosphere in (4).

Figure 2:
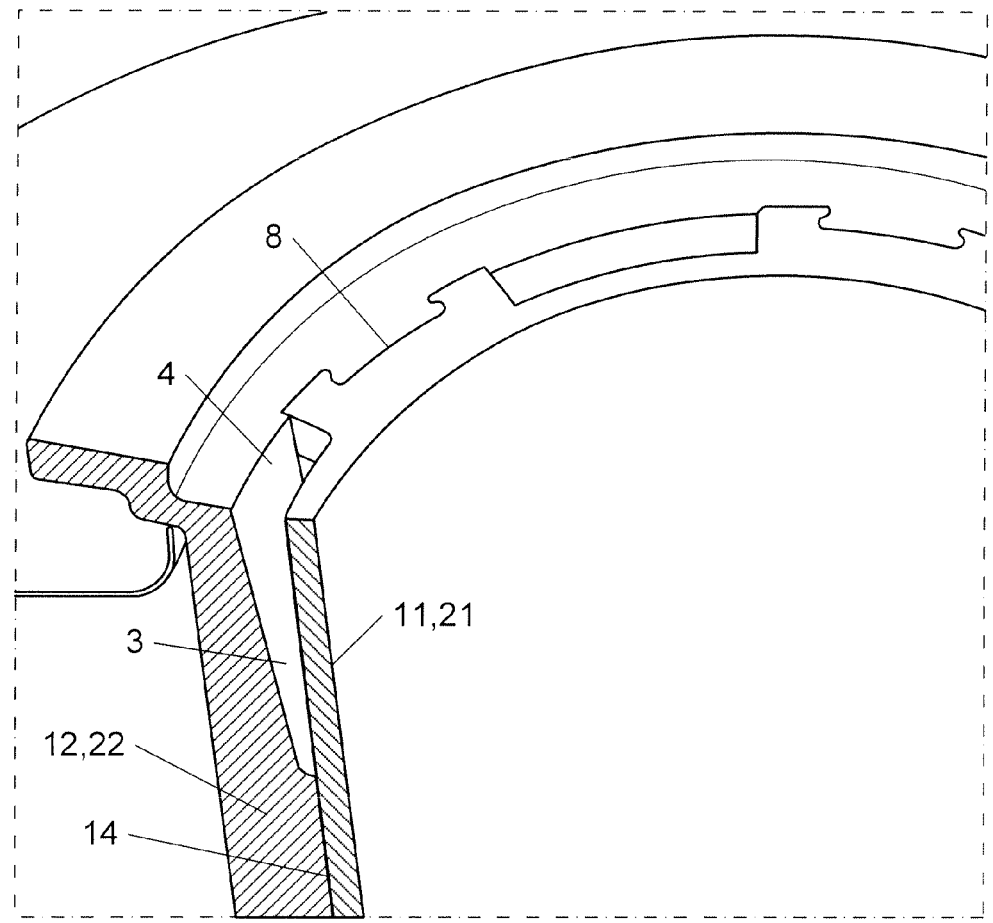
FIG. 2 is a cutaway perspective view of the mouth and neck region of a preform or bag-in-container according to a preferred embodiment of the present invention.

Many vent geometries have been disclosed and it is not critical which geometry is selected. It is preferred, however, that the vent be located adjacent to, and oriented coaxially with said preform's mouth (5) as illustrated in FIG. 1. More preferably, the vents have the shape of a wedge with the broad side at the level of the opening (4) thereof and getting thinner as it penetrates deeper into the vessel, until the two layers meet to form an interface (14) at least at the level of the neck region as illustrated in FIG. 2. This geometry allows for a more efficient and reproducible delamination of the inner bag upon use of the bag-in-container. The container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three, and most preferably, at least four vents open at regular intervals of the mouth lip.

The preform of the present invention consists of an integral preform obtained by injection moulding one layer on top of the other. This solution offers a number of advantages over preform assemblies, like for instance, that it requires no assembly step and one production station only is sufficient for the integral preform fabrication when at least two are required for a preform assembly.

Preferred materials for the layers of the preform and bag-in-container of the present invention are polyesters like PET, PEN, PTT, PTN; polyamides like PA6, PA66, PA11, PA12; polyolefins like PE, PP; EVOH; biodegradable polymers like polyglycol acetate (PGAc), Polylactic acid (PLA); and copolymers and blends thereof. The requirement according to the present invention for the materials of the inner and outer layers is that the melting temperature of the outer layer is lower than, or equal to the one of the inner layer, $T_{m,outer} \leq T_{m,inner}$. This condition is exactly the opposite to the one taught in EPA1356915 and U.S. Pat. No. 6,649,121. This departure from the teaching of said prior art is rendered possible by the discovery by the present inventors that the integral preform can advantageously be produced with the following sequential steps:
injection moulding the inner layer first onto a core;
followed by injection moulding the outer layer onto the inner layer; and
extracting the thus formed preform from the core;

This approach is more advantageous than the one proposed in EPA1356915 and U.S. Pat. No. 6,649,121 for the following reasons. As discussed in the review of the background art, a bag-in-container must comprise at least one interface vent fluidly connecting the interface between inner and outer layers to the atmosphere. In the field of beverage dispensing containers, the assembled (i.e., not integrally blow-moulded) bag-in-containers used to date, traditionally and for practical reasons, are provided with vents located adjacent to, and oriented coaxially with the bag-in-container's mouth. So as to progressively replace the traditional, assembled bag-in-containers by integrally blow-moulded ones, and so as to allow the consumer to keep the same appliance the bag-in-container is to be mounted into, the same vents location is preferably maintained. The present process allows to provide integral preforms with vents fluidly connecting the interface between inner and outer layers to the atmosphere, provided an appropriate tool is used.

The tool is of the core-shell type and comprises a core mould provided at the base thereof with at least one pin suitable for forming a vent at the interface between the first and second layers of the preform. The core may comprise a single pin, but it preferably comprises more than one pin in order to have several vents opening around the lip of the container's mouth. The pins preferably have the shape of a wedge as, on the one hand, a wedge shaped vent has the advantages discussed above and, on the other hand, it allows for easier extraction of the thus produced integral preform from the mould core. The dimensions of the pins depend on the size of the bag-in-container and, in particular, of the mouth and lip thereof For a typical home beverage dispenser of a capacity of about 56 liters, the pins have a height of about 5 to 75 mm, preferably 5 to 50 mm, most preferably 10 to 20 mm and their base, forming the vents openings, preferably are in the shape of an arc section of length comprised between 3 and 15 mm, preferably 5 and 10 mm and of width comprised between 0.5 and 5 mm, preferably 0.5 and 2 mm.

Preferably, the integral preform of the present invention comprises mechanical interlocking means (8) for fixing the inner layer to the outer layer. This allows an easier and safer handling of the preform and facilitates the extraction of the preform from the injection moulding core.

The preform of the present invention can be produced semicontinuously with an apparatus comprising:
  support means provided with at least two similar cores (male), preferably of the type described above;
  at least first and second shell moulds (female) each connected to an extruder, such that the first shell mould is dimensioned for producing in combination with a core the inner layer and the second shell mould for producing the outer layer on top of the inner one;
  optionally at least one extraction station,
  means for moving the support means so that each core can be positioned sequentially opposite the first shell mould, the second shell mould, and optionally the extraction station.

The apparatus of the present invention may include a separate extraction station, for example to allow further cooling of the part prior to extraction or, if the preform is extracted upon opening the mould after the injection of the second layer, it may well do without one. The means for moving the support means from one shell mould to the other and, optionally, to the extraction station may be linear, using a "shuttle," or rotational, using a "carrousel."

The two layers (11) and (12) of the preform according to the present invention are connected by an interface (14) throughout substantially the whole inner surface of the outer layer. Although the inner and outer layers of the preform may adhere at said interface (14), the inner and outer layers (21) and (22) of the bag-in-container (2) produced by blow-moulding the preform (1) do delaminate upon injection of a pressurized gas at a point of the interface. It is generally believed that better results are obtained when at least one of the inner and outer layers comprises a semi-crystalline polymer.

It has surprisingly been observed that excellent delamination results between the inner and outer layers of bag-in-containers can be obtained also with integral preforms wherein both inner and outer layers consist of the same material. This discovery is in contradiction with the teaching of the prior art with respect to the choice of materials of the inner and outer layer which, as quoted from JPA2005047172, must consist of "mutually non-adhesive synthetic resins." It has now been shown that excellent integrally blow-moulded bag-in-containers may be produced with the inner and outer layers made of the same material. Hence, according to the present invention, the melting temperature of the inner layer can be equal to the melting temperature of the outer layer.

The same polymer is considered in contact on either side of the interface between the inner and outer layers in the following cases:
  inner and outer layers consist of the same material (e.g., $PET_{inner}PET_{outer}$, regardless of the specific grade of each PET); or
  the inner and outer layers consist of a blend or copolymer having at least one polymer in common, provided said polymer in common is at the interface, whilst the differing polymer is substantially absent of said interface (e.g., $(0.85\ PET+0.15\ PA6)inner(0.8\ PET+0.2\ PE)_{outer}$.

The presence in a layer of low amounts of additives is not regarded as rendering the material different, so far as they do not alter the interface substantially.

The bag-in-container (2) of the present invention can be obtained by providing a preform as described above; bringing said preform to blow-moulding temperature; fixing the thus heated preform at the level of the neck region with fixing means in the blow-moulding tool; and blow-moulding the thus heated preform to form a bag-in-container. The inner and outer layers (21) and (22) of the thus obtained bag-in-container are connected to one another by an interface (24) over substantially the whole of the inner surface of the outer layer. Said interface (24) is in fluid communication with the atmosphere through the vents(3), which maintained their original geometry through the blow-moulding process since the neck region of the preform where the vents are located is held firm by the fixing means and is not stretched during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, and on the pressure of the gas injected. The interfacial strength is of course a key issue and can be modulated by the choice of the material for the inner and outer layers, and by the process parameters during blow-moulding; the pressure-time-temperature window used is of course of prime importance and greatly depends on the material selected for the inner and outer layers.

A release agent may be applied on the outer surface of the inner layer prior to injection moulding the outer layer onto the inner layer. Hence the release agent is positioned at the interface and facilitates delamination of the inner layer and outer layer. Any release agents available on the market and best adapted to the material used for the preform and resisting the blowing temperatures, like silicon- or PTFE-based release agents (e.g., Freekote) may be used.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

EXAMPLE

A preform according to the present invention was produced by injecting a melt into a first mould cavity cooled to form the preform's inner layer. The core comprising the inner layer was moved to a second cavity cooled at the same temperature as the first one, and a melt was injected over the inner layer present in the cavity and the preform was extracted. It comprised vents (3) and interlocking means (8) as illustrated in FIG. 2.

The preform produced as explained above was heated in an oven comprising an array of IR-lamps and then fixed into a blow-moulding mould which walls were maintained at a desired temperature. Air was blown into the preform under pressure. The thus produced bag-in-container was then filled with a liquid and connected to an appliance for dispensing beverage comprising a source of compressed air in order to determine the delamination pressure.

The delamination pressure was determined as follows. The interface vents of the bag-in-container were connected to the source of compressed air. Air was injected through the vents at a constant pressure and the interface between inner and outer layers was observed; the pressure was increased stepwise until delamination pressure was reached. Delamination pressure is defined as the pressure at which the inner bag separates from the outer layer over the whole of their interface and collapses. The surfaces of the thus separated layers were examined for traces of bonding.

The delamination pressure of the bag-in-container described above was of about 05±0.1 bar overpressure and showed little trace of cohesive fracture between the inner and outer layers. This example demonstrates that bag-in-containers of excellent quality can be produced with integral preforms according to the present invention.

We claim:
1. An integrally blow-moulded dispensing bag-in container consisting of:
  (a) an outer container made of a single layer, said single layer comprising PET having a first melting temperature, said outer container comprising a body portion, and a neck region, and a mouth;
  (b) a collapsible inner bag made of a single layer, said single layer comprising PET having a second melting temperature that is greater than or equal to the first melting temperature, said inner bag comprises a neck region and a body portion being fixed to the outer container at least at the neck;
  (c) at least one vent fluidly connecting the region between the inner bag and the outer container, said vent open to the atmosphere;
  (d) the outer container and said inner bag are releasably adhered to one another over substantially the entirety of the inner bag and outer container so as to readily delaminate at the body portion upon introduction of a pressurized gas through at least one vent between the inner bag and the outer container, so as to collapse the body portion of the inner bag and dispense a liquid contained therein.

* * * * *